US006855411B2

(12) United States Patent
Su et al.

(10) Patent No.: US 6,855,411 B2
(45) Date of Patent: Feb. 15, 2005

(54) POLYOLEFIN OIL RESISTANT FILM USING VOID INITIATING SOLID PARTICLES

(75) Inventors: Tien-Kuei Su, North Kingstown, RI (US); Leo Moreau, North Kingstown, RI (US); Kevin Kitchin, North Kingstown, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 42 days.

(21) Appl. No.: 10/234,150

(22) Filed: Sep. 5, 2002

(65) Prior Publication Data

US 2003/0059597 A1 Mar. 27, 2003

Related U.S. Application Data

(60) Provisional application No. 60/328,431, filed on Oct. 12, 2001, and provisional application No. 60/324,547, filed on Sep. 26, 2001.

(51) Int. Cl.[7] .............................................. B32B 15/08

(52) U.S. Cl. .................... 428/317.9; 428/354; 428/461; 428/516; 428/910

(58) Field of Search ............................. 428/516, 308.4, 428/314.4, 317.1, 317.9, 910, 354, 461

(56) References Cited

U.S. PATENT DOCUMENTS

| | | | | | |
|---|---|---|---|---|---|
| 4,663,216 | A | * | 5/1987 | Toyoda et al. | 428/212 |
| 4,701,369 | A | | 10/1987 | Duncan | |
| 5,232,756 | A | | 8/1993 | Chang et al. | |
| 5,397,635 | A | | 3/1995 | Wood, Jr. | |
| 5,667,872 | A | * | 9/1997 | Ohno et al. | 428/141 |
| 2001/0036542 | A1 | * | 11/2001 | Marks | 428/212 |

FOREIGN PATENT DOCUMENTS

| | | |
|---|---|---|
| WO | WO 98/49003 | 11/1998 |

* cited by examiner

*Primary Examiner*—D. Lawrence Tarazano
(74) *Attorney, Agent, or Firm*—Morrison & Foerster LLP

(57) ABSTRACT

A biaxially oriented polyolefin multilayer film having a skin layer having oil-absorbing voids is disclosed. The film has substantially a small amount of void-initiating particles in the skin layer and typically no fillers in the core layer. Yet the film shows no visible distortion after exposure to food products such as potato chips.

21 Claims, No Drawings

POLYOLEFIN OIL RESISTANT FILM USING VOID INITIATING SOLID PARTICLES

RELATED APPLICATIONS

This application claims priority from Provisional Application Ser. Nos. 60/324,547 filed Sep. 26, 2001, entitled the same as above, and 60/328,431, filed Oct. 12, 2001, entitled "Polyolefin oil resistant film using calcium carbonate particles," the entire disclosures of which are hereby incorporated herein by reference.

FIELD OF INVENTION

The invention relates to polyolefinic multilayer film comprising a core layer of polypropylene and at least one outer layer. More specifically, the invention relates to a biaxially oriented polypropylene film that does not distort in the presence of food oils.

BACKGROUND OF INVENTION

Biaxially oriented polypropylene film laminations are commonly used in the snack food packaging industry. In particular, potato chip packaging is a very large volume application.

In the case of potato chip packaging, oils such as cottonseed oil, corn oil, and soybean oil are present on the potato chip surface. Some of this oil on the potato chip surface transfers to the package's internal surfaces. Similarly, other types of baked food snack products also have oils that are known to swell the polypropylene. Since these food oils are non-polar, the polypropylene film absorbs them quite readily, particularly at elevated temperatures. This absorption of food oils by the film gives a distorted appearance to the entire package by causing dimpling in the film.

This surface distortion effectively destroys the surface gloss of the package and gives the appearance that the package has been mishandled. This distortion is undesirable to snack food manufacturers, as they would like to represent the product as being fresh or new to the shelf.

Oriented polypropylene films currently available on the market have attempted to address this issue in two ways. First, by preventing the migration of the food oils into the polypropylene layer(s) of the film. Second, by stiffening the film such that the distortions are not so visible to the human eye.

Typically, for preventing migration of the food oils to the polypropylene layer(s) of the film, a metallized layer such as an aluminum layer is applied to the inside the film in contact with the food products. The oil does not penetrate though an intact aluminum layer. However, the problems of applying the metallized layer on the inside of the film are the following. First, the metallized layer tends for form cracks through which the oils leak into the polypropylene layer(s) of the film. Second, it is preferred to have the metallized layer on the side of the film that will be the outside surface of the food package. This is because the metallized layer provides a glossy background to the images printed on the surface of the food package.

The stiffening of the film is typically done by adding inorganic fillers such as calcium carbonate, titanium dioxide, etc., to the core layer of the film. The addition of fillers not only provide increased stiffness but could also provide opacity, e.g., by creating voids using $CaCO_3$, and whiteness, e.g., by using $TiO_2$. See, U.S. Pat. No. 4,303,708 (Gebhardt), U.S. Pat. No. 4,377,616 (Ashcraft), U.S. Pat. No. 4,632,869 (Park), U.S. Pat. No. 4,652,489 (Crass), U.S. Pat. No.

5,134,173 (Joesten), and U.S. Pat. No. 6,048,608 (Peet). The common features of these patents is that they use fillers in a core layer for creating opacity in the film and have a void-free layer on the surface of the film that would contact the food products.

In short, the approach taken by the prior art references was to incorporate a solid, void-free layer at the film surface that would be in contact with the food products. The idea behind the prior art films was the following. If one can prevent migration of the oils from the food products into the film using a solid, void-free layer on the film surface that would be in contact with the food products, then one should be able to minimize migration of oils into the film. Thereby, one can prevent distortion of the film. If distortion is still visible, the prior art films attempted to minimize distortion by stiffening the films by adding fillers to the core layer.

The approach utilized by the prior art films discussed above has the following impacts. It generally does not prevent migration of the oils into the core layer, but the distortion is suppressed by stiffening the film and increasing the thickness of the film. Stiffening the film makes the film heavier and less flexible while increasing the film thickness increases the cost of the film. Therefore, it is the objective of this invention to provide an economical solution to this package distortion problem caused by the oils of the food product being packaged.

SUMMARY OF THE INVENTION

This invention provides a film that does not distort in the presence of food oils, particularly at elevated temperature conditions. This invention further maintains the necessary properties of the film including oxygen barrier, moisture barrier, cold seal adhesion, and heat seal performance. Achieving these objectives will result in a package with very good surface aesthetics, excellent heat seal or cold seal adhesion performance, and exceptional barrier performance.

As explained above, the prior art structures use fillers to make the film stiff and opaque. In addition, the prior art structures use a void-free layer on the film surface contacting the food products to prevent migration of the food oils into the film.

The applicants of this invention have arrived at a totally counter-intuitive approach than that adopted by the prior art structures to solve the problem of distortion. Applicants have surprisingly found that by creating voids (cavities) in the skin layer contacting the food products for the purposes of allowing food oils to reside in these cavities, it is possible to reduce or eliminate film distortion caused by the oils swelling the polypropylene film itself. These cavities can also exist in the core layer besides the skin layer of the film.

Applicants have successfully produced such a void-containing film structure that is capable of making a finished package product having the following characteristics: 1) strong seals, 2) excellent barrier, 3) excellent lamination bond strength, 4) excellent print quality, and 5) excellent gloss or surface aesthetics.

Applicants have also determined that increasing the thickness of the lamination can reduce this distortion. Thus, increasing the lamination thickness lends additional structural support to the lamination and reduces the distortion of the entire package. However, increasing the thickness of the lamination is uneconomical since consuming more raw materials is always considerably more expensive.

As will be realized, this invention is capable of other and different embodiments, and its details are capable of modifications in various obvious respects, all without departing from this invention. Accordingly, the description is to be regarded as illustrative in nature and not as restrictive.

DETAILED DESCRIPTION OF THE INVENTION

This invention provides a polyolefin film preferably having at least two layers, including a first skin layer, which is in direct contact with the packaged product. This skin layer could be functional such as a heat seal layer or a cold seal adhesion layer and may also contain void initiating solid particles. A core layer, adjacent to the polyolefin skin layer, may also contain void initiating solid particles. A second polymeric skin layer may also be incorporated on the opposite side of the core layer from the first skin layer. This second polymeric layer may function as a layer for metallization, printing, adhesive lamination, extrusion lamination and coatings. More particularly preferred is a layer for metallization.

The first polyolefin skin layer can function as a heat-seal layer or a layer for cold seal adhesion. The term heat seal is defined as sealing upon the onset of heat. For a package to cold seal, a cold seal cohesive must be pattern applied by a rotogravure coating process to the cold-seal adhesion skin layer. The term cold seal is defined as sealing a product at room temperature with the application of only pressure.

The voids in the skin layer are capable of absorbing oil and, therefore, called oil-absorbing voids. The oil-absorbing voids can absorb oil due to any mechanism. For example, the oil-absorbing voids can absorb oil due to the presence of oil-absorbing particles in the voids. Another reason why the oil-absorbing voids can absorb oil is due to adsorption of oil on the surface of the particles located in the voids or on the internal surfaces of the voids themselves. Still another reason why the oil-absorbing voids can absorb oil could be due to the capillary action of the voids, in which case, the voids act like pores in a sponge and soak up the oil.

The term void initiating solid particles refers to particles that can create voids in a film upon the biaxial stretching of the film. It has also been considered that the absorbed food oils that are in direct contact with the skin layer will reside in these voids. It is also considered that the porosity of the solid particles themselves will attract oil away from the polypropylene matrix. Thus, the oil will choose the path of least resistance and reside within the film voids or the pores of the solid particles, if these pores exist. Since the outer layer is very thin in relation to the core layer, only a small amount of voids can be created by the solid particles in the skin layer. However, it has been found very effective to create voids in the skin layer to overcome the swelling of the polypropylene.

The core layer can also be loaded with void initiating solid particles in conjunction with the skin layer. It is considered that food oils that have not been absorbed by the voids of the outermost skin will be absorbed by the voids of the core layer created by the solid particles. Since the oil will now reside in the voids, swelling of the polyolefin film will not occur. As a consequence, the film will not be distorted and thus the flexible package will not be distorted.

In one embodiment, the film is a biaxially oriented polypropylene multi-layer film with the following structure:

(a) a skin layer that preferably comprises a polyolefin polymer containing solid particle which initiates void formation upon orientation, whereby this layer may be additionally treated by a surface treatment method; and (b) a core layer that preferably comprises a polyolefin polymer whereby this layer may be additionally treated by a surface treatment method.

Another embodiment of the invention is a biaxially oriented polyolefinic based coextruded film comprising:

(a) a core layer that preferably comprises a polyolefin polymer containing solid particle which initiates void formation upon orientation, whereby this layer may be additionally treated by a surface treatment method; and (b) a skin layer comprising a polyolefin resin and containing solid particles that initiates void formation upon orientation.

The core layer can be any polyolefin polymer that can be uniaxially or biaxially oriented. Such polymers include but are not limited to: isotactic polypropylene homopolymer, syndiotactic polypropylene homopolymer, metallocene catalyzed isotactic polypropylene homopolymer, metallocene catalyzed syndiotactic polypropylene, ethylene-propylene random copolymer, butene-propylene random copolymer, high density polyethylene, low density polyethylene, linear low density polyethylene and blends thereof. Most preferred is a core layer of an isotactic polypropylene homopolymer resin. The isotactic polypropyelene resin can be defined as having a melt flow in the range of 1–9 g/10 min. More particularly preferred is a melt flow rate in the range of 1–5 g/10 min. Most particularly preferred is a melt flow rate in the range of 1–3 g/10 min.

The core layer can be surface treated with either a standard corona treatment, flame treatment, atmospheric plasma, or a special corona treatment utilizing a mixed gas environment of nitrogen and carbon dioxide. Most particularly preferred is a surface treatment consisting of a special corona treatment utilizing a mixed gas environment of nitrogen and carbon dioxide. This core layer can then be directly metallized, printed, coated, adhesive laminated, or extrusion laminated. Most particularly preferred is metallization of the core layer.

The skin layer could be a cold seal adhesion layer. The cold seal adhesion layer can be composed of any of the following and blends thereof: an isotactic polypropylene homopolymer, syndiotactic polypropylene homopolymer, metallocene catalyzed isotactic polypropylene homopolymer, metallocene catalyzed syndiotactic polypropylene homopolymer, ethylene-propylene random copolymer, butene-propylene random copolymer, ethylene-propylene-butene-1 terpolymer, low density polyethylene, linear low density polyethylene, very low density polyethylene, metallocene catalyzed polyethylene, metallocene catalyzed polyethylene copolymers, ethylene-methacrylate copolymers, ethylene-vinyl acetate copolymers, and ionomer resins.

This cold seal adhesion layer can be surface treated with either a standard corona treatment, flame treatment, atmospheric plasma, or a special corona treatment utilizing a mixed gas environment of nitrogen and carbon dioxide. Most particularly preferred is corona treatment.

The skin layer could be a heat sealable layer. The heat seal layer can be composed of any of the following and blends thereof: an ethylene-propylene random copolymer, ethylene-butene-1 copolymer, ethylene-propylene-butene-1 terpolymer, propylene-butene copolymer, low density polyethylene, linear low density polyethylene, very low density polyethylene, metallocene catalyzed polyethylene plastomer, metallocene catalyzed polyethylene, metallocene catalyzed polyethylene copolymers, ethylene-methacrylate copolymer, ethylene-vinyl acetate copolymer and ionomer resin.

One aspect of this invention is the oil absorptive properties of voids created by the solid particles either in the polypropylene core layer, in the a skin layer adjacent to the core layer, or both. These voids absorb the oil first rather than allowing the oil to swell the polypropylene and distort the film as a consequence. Calcium carbonate is a preferred particle because of its particle shape, particle size, low cost, and availability. However any particle may be used which creates voids upon biaxial orientation of the film. In general, the particles should be round in shape and approximately greater than 1 micron in average diameter. The particles can be either organic or inorganic. It is obvious that inorganic particles such as calcium carbonate, silicone dioxide, sodium aluminosilicate and activated carbon can be used since these will not melt at polyolefin extrusion and orienting temperatures. However, organic particles can be used that are incompatible with the matrix polyolefin material. Such organic particles must either be crosslinked, have a higher melting temperature than the matrix olefin material, or if amorphous must have a higher glass transition temperature than the melting temperature of the olefin matrix material.

EXAMPLE 1

A 65 gauge biaxially oriented polypropylene (BOPP) film was manufactured on a 1.5-meter wide BOPP production line. The skin layer was measured at 8 gauge units. The skin layer used a ethylene-butene-propylene terpolymer at a melt flow rate of 9.5 g/10 min as measured by ASTM D1238. 10.5% by weight of calcium carbonate was added to this skin layer Isotactic polypropylene resin was used in the core layer. The melt flow rate of the core isotactic polypropylene homopolymer was 1.6 g/10 min.

COMPARATIVE EXAMPLE 1

A 65 gauge biaxially oriented polypropylene (BOPP) film was manufactured on a 1.5-meter wide BOPP production line. The skin layer was measured at 8 gauge units. The skin layer used a ethylene-butene-propylene terpolymer at a melt flow rate of 9.5 g/10 min as measured by ASTM D1238. Isotactic polypropylene resin was used in the core layer. The melt flow rate of the core isotactic polypropylene homopolymer was 1.6 g/10 min.

The sheet was heated to 135° C., stretched 5 times in the machine direction, cooled, introduced into a tenter oven, heated to 164° C., stretched to 9 times in the transverse direction and cooled.

COMPARATIVE EXAMPLE 2

A 65-gauge biaxially oriented polypropylene (BOPP) film was manufacture on a 1.5-meter wide BOPP production line. The skin layer was measured at 8 gauge units. The skin layer used a ethylene-butylene-propylene terpolymer at a melt flow rate of 9.5 g/10 min as measured by ASTM D1238. Isotactic polypropylene with a melt flow rate of 1.6 g/10 min was used in the skin layer. 10% by weight of calcium carbonate was blended with isotactic polypropylene.

The films were metallized in a Shimadzu bell jar metallizer that evaporated aluminum on the core side of the film. Potato chips were then crushed into small pieces. Ten grams of the crushed potato chips were weighed and placed in a 9.6 in$^2$ surface area on the skin layer side of the film. The samples were next placed in a convection oven at 115° C. for 3 and 6 hours respectively. The crushed chips and oil were then cleaned from the surface with isopropyl alcohol. The samples were evaluated qualitatively for film distortion by seeing the amount of dimpling occurring in the film. A rating of 5 was given for the worst distortion, a rating of 0 was given for a sample that has no distortion. Thus, the data in Table 1 is based on this relative ranking system.

TABLE 1

Distortion in samples tested.

| | Description of the bi-layer film | Thickness of the void-containing layer | Distortion After 3 hours at 115° C. | Distortion After 6 hours at 115° C. |
|---|---|---|---|---|
| Example 1 | Void containing skin with 10.5 wt. % $CaCO_3$ | 8 gauge | 0 | 0 |
| Comparative Example 1 | Void-free film | 0 gauge | 2.5 | 4 |
| Comparative Example 2 | Void containing core with 10 wt. % $CaCO_3$ | 57 gauge | 0 | 0 |

Table 1 shows that the distortion in the void-free film of Comparative Example 1 was bad after testing for distortion. The distortions in the films of Example 1 and Comparative Example 2 were non-existent after testing for distortion. By comparing the films of Example 1 with Comparative Example 2, it is evident that the amount of filler added in Comparative Example 2 is almost 7 times that added in Example 1. Therefore, even though Comparative Example 2 produced no distortion, it was due to increased stiffness of the film resulting from the high level of fillers in the core layer. On the other hand, the distortion of the film of Example 1 was the same as that of Comparative Example 2 even though the amount of fillers in the skin layer of Example 1 was only about 1/7 of the amount of fillers in Comparative Example 2. This outstanding performance of the film of Example 1 with much less fillers than in the film of Comparative Example 2 was due to the oil absorption in the voids in the skin layer of the film of Example 1. Once the oils from the potato chips were absorbed by the voids in the skin layer of the film of Example 1, the remaining portion of the film, i.e., the core layer, was unaffected by the oils. Therefore, the core layer of the film of Example 1 had good stiffness even without the presence of fillers in the core layer. This, in turn, prevented the film of Example 1 from distorting by the distortion test.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the priority documents, patents and publications referred in this application are hereby incorporated herein by reference.

What is claimed is:

1. A biaxially oriented polyolefin multilayer film comprising a metallized layer and a skin layer having a surface exposed to an environment surrounding the film, the skin layer being a single layer and comprising oil-absorbing voids adjacent to the surface, wherein a thickness of said skin layer is in a range of about 1% to about 40% of the total thickness of the film, wherein the voids contain particles and a weight percent of the particles on a basis of the total weight of the skin layer is about 0.5% to about 15%.

2. The film of claim 1, wherein the voids are exposed to the environment.

3. The film of claim 1, wherein the particles comprise oil-absorbing particles.

4. The film of claim 1, wherein the particles have an average particle size in the range of about 1 micron to about 8 micron.

5. The film of claim 1, wherein the particles are inorganic particles, organic particles, or combinations thereof.

6. The film of claim 1, wherein the particles are selected from the group consisting of calcium carbonate, silicone dioxide, sodium aluminosilicate and activated charcoal.

7. The film of claim 1, wherein the skin layer comprises polypropylene.

8. The film of claim 1, wherein the skin layer is a cold seal adhesion layer, a heat sealable layer, or combinations thereof.

9. The film of claim 8, wherein the cold seal adhesion layer is surface treated with a corona treatment, a flame treatment, atmospheric plasma, or a corona treatment utilizing a mixed gas environment of nitrogen and carbon dioxide.

10. The film of claim 8, wherein the cold seal adhesion layer comprises a material selected from the group consisting of an isotactic polypropylene homopolymer, syndiotactic polypropylene homopolymer, metallocene catalyzed isotactic polypropylene homopolymer, metallocene catalyzed syndiotactic polypropylene homopolymer, ethylene-propylene random copolymer, butene-propylene random copolymer, ethylene-propylene-butene-1 terpolymer, low density polyethylene, linear low density polyethylene, very low density polyethylene, metallocene catalyzed polyethylene, metallocene catalyzed polyethylene copolymers, ethylene-methacrylate copolymers, ethylene-vinyl acetate copolymers, ionomer resins and combinations thereof.

11. The film of claim 8, wherein the heat sealable laser comprises a material selected from the group consisting of an ethylene-propylene random copolymer, ethylene-butene-1 copolymer, ethylene-propylene-butene-1 terpolymer, propylene-butene copolymer, low density polyethylene, linear low density polyethylene, very low density polyethylene, metallocene catalyzed polyethylene plastomer, metallocene catalyzed polyethylene, metallocene catalyzed polyethylene copolymers, ethylene-methacrylate copolymer, ethylene-vinyl acetate copolymer, ionomer resin and combinations thereof.

12. The film of claim 1, further comprising a core layer.

13. The film of claim 12, wherein the core layer comprises a material selected from the group consisting of isotactic polypropylene homopolymer, syndiotactic polypropylene homopolymer, metallocene catalyzed isotactic polypropylene homopolymer, metallocene catalyzed syndiotactic polypropylene, ethylene-propylene random polymer, butene-propylene random copolymer, high density polyethylene, low density polyethylene, linear low density polyethylene and combinations thereof.

14. The film of claim 12, wherein the core layer is surface treated with a corona treatment, a flame treatment, atmospheric plasma, or a corona treatment utilizing a mixed gas environment of nitrogen and carbon dioxide.

15. The film of claim 1, wherein the metallized layer comprises aluminum and has an optical density in the range of from about 1.6 to about 3.5.

16. The film of claim 1, wherein a thickness of said skin layer is in a range of about 5% to about 25% of the total thickness of the film.

17. The film of claim 1, wherein a thickness of said skin layer is in a range of about 10% to about 20% of the total thickness of the film.

18. A food packing material comprising a biaxially oriented polyolefin multilayer film of claim 1.

19. The food packaging material of claim 18, wherein a thickness of said skin layer is in a range of about 5% to about 25% of the total thickness of the film.

20. The food packaging material of claim 18, wherein a thickness of said skin layer is in a range of about 10% to about 20% of the total thickness of the film.

21. The food packaging material of claim 18, further comprising an adhesive layer.

* * * * *